United States Patent [19]

Lee et al.

[11] Patent Number: 4,990,413

[45] Date of Patent: Feb. 5, 1991

[54] COMPOSITE SOLID ELECTROLYTES AND ELECTROCHEMICAL DEVICES EMPLOYING THE SAME

[75] Inventors: Mei-Tsu Lee, Los Angeles, Calif.; Denis Fauteux, Centerville, Ohio

[73] Assignee: MHB Joint Venture, Ohio

[21] Appl. No.: 298,169

[22] Filed: Jan. 18, 1989

[51] Int. Cl.$^5$ .......................... H01M 6/16; H01M 6/18
[52] U.S. Cl. .................................... 429/191; 429/192; 429/193; 252/62.2
[58] Field of Search ............................... 429/191–193; 252/62.2

[56] References Cited

U.S. PATENT DOCUMENTS

| | | | |
|---|---|---|---|
| 4,471,037 | 9/1984 | Bannister | 429/192 X |
| 4,734,343 | 3/1988 | Berthier et al. | 429/192 |
| 4,818,643 | 4/1989 | Cook et al. | 429/192 X |

*Primary Examiner*—Stephen J. Kalafut
*Attorney, Agent, or Firm*—Thompson, Hine & Flory

[57] ABSTRACT

A composite solid electrolyte comprising a mixture of a solid ionically conductive powder and an ionically conductive polymeric material wherein said polymeric material provides a network for containing said solid ionically conductive powder, and a method for producing the electrolyte is disclosed.

23 Claims, No Drawings

COMPOSITE SOLID ELECTROLYTES AND ELECTROCHEMICAL DEVICES EMPLOYING THE SAME

BACKGROUND OF THE INVENTION

1. Field of the invention.

The present invention relates to the manufacture of a composite solid electrolyte and, more particularly, a composite solid electrolyte comprising a mixture of a solid ionically conductive powder and an ionically conductive polymeric material wherein the powder is maintained in a matrix formed by the polymeric material.

2. Description of the Prior Art.

Solid state electrochemical devices are the subject of intense investigation and development. They are described extensively in the patent literature. See, for example, U.S. Pat. Nos. 4,303,748 to Armand; 4,589,197 to North; 4,547,440 to Hooper et al, and 4,228,226 to Christiansen. These cells are typically constructed of an alkali metal foil anode, an ionically conducting polymeric electrolyte solution containing an ionizable alkali metal salt, and a finely divided transition metal oxide as a cathode.

Solid electrolyte powders which are ionically conductive are disclosed in U.S. Pat. Nos. 4,247,499 to Glugla et al.; 4,388,385 and 4,414,607 to Sekido et al.; 4,394,280 to Von Alpen et al.; 4,432,891 to Susman et al.; 4,539,276 to Harbach; and 4,557,985 to Voss.

The solid electrolyte in Glugla et al. U.S. Pat. No. 4,247,499 comprises a crystalline inorganic material embedded in a polymeric film. The preferred ionic conductive crystal is a beta-alumina crystal. The solid electrolyte in Sekido et al. U.S. Pat. No. 4,388,385 and 4,414,607 is based on a silver halide source. A particularly preferred electrolytic powder has the formula of $RbCu_4I_{1.75}Cl_{3.25}$. Matsushita Electric Industrial Company, assignee to the Sekido et al. patents, has developed a paper electrolyte wherein the electrolytic powder is mixed with a high polymer insulator material derived from styrene and butadiene and made into a cement. Von Alpen et al. U.S. Pat. No. 4,394,280 discloses a mixed crystal for use as an ion conducting solid electrolyte which is formed from components of $Na_2O$, $ZrO_2$, $P_2O_5$ and $SiO_2$. Susman et al. U.S. Pat. No. 4,342,891 disclose a glass capable of ionic conduction. The glass is prepared from a non-metal glass former such as $GeS_2$, $B_2S_3$ and $SiS_2$ in mixture with a glass modifier such as $Na_2S$. Voss U.S. Pat. No. 4,557,985 discloses a ceramic solid electrolyte. The electrolyte may take the form of a beta-alumina, a mixed crystal component, or a lithium nitride material.

Although the above-described solid electrolyte powders have been used in electrochemical devices, they suffer as a result of their powdery form. In practice, to produce a solid electrolyte material from the ionically conductive powders, the powders are typically compressed or compacted, by a mold, for example, to form a tightly adherent body. For some materials, particularly glass and ceramic materials, it is nearly impossible to form a unitary structure without the addition of materials such as binders. For other materials where a unitary structure may be produced, the resulting structure is extremely brittle and may be easily fractured as a result of its inflexible physical state.

Prior art references have taught that it is possible to form an electrolyte material by forming an interpenetrating network from a curable material wherein the network functions to house an ionically conductive electrolyte. For example, Bauer et al. U.S. Pat. No. 4,654,279 describes a cell in which the electrolyte is a two phase interpenetrating network of a mechanically supporting phase of a continuous network of a crosslinked polymer and an interpenetrating conducting liquid polymer phase comprising an alkali metal salt of a complexing liquid polymer which provides continuous paths of high conductivity throughout the matrix. In one embodiment, a liquid complex of a lithium salt and polyethylene oxide is supported by an epoxy, a polymethacrylate, or a polyacrylonitrile matrix. The network is formed by preparing a liquid solution of the metal salt, the salt-complexing liquid polymer, and the monomer for the crosslinked supporting phase in a polar solvent. The solvent is evaporated to form a dry layer of a mixture of the remaining materials. The dry layer is then cured.

Le Mehaute et al. U.S. Pat. No. 4,556,614 discloses a solid electrolyte solution for an electrochemical cell in which a salt complexing polymer is mixed with a miscible and crosslinkable second polymer. The function of the second polymer is to maintain the complexing polymer in a more highly conductive amorphous state. This is accomplished by forming a solution of the two polymers and an ionizable salt in a solvent, evaporating the solvent, and crosslinking the second polymer. The second polymer is crosslinked by radiation.

Commonly assigned U.S. patent application Ser. No. 115,492 discloses a polymeric electrolyte wherein a radiation inert ionically conducting liquid having an ionizable alkali metal salt complexed therewith is maintained in a network of a cured photohardened polymer.

Although solid ionically conductive powders are known in the art, and the use of ionically conductive polymeric materials to form a matrix for housing an ionically conductive liquid or solid solution is known in the art, there has been no suggestion that an ionically conductive polymeric material be used to form a matrix for housing a solid ionically conductive powder for improving the mechanical properties of the electrolyte.

Accordingly, there exists a need in the art for a solid electrolyte which has improved mechanical properties without a corresponding reduction in ionic conductivity.

SUMMARY OF THE INVENTION

In accordance with the present invention, a composite solid electrolyte and a method for producing the electrolyte is provided.

The inventive composite solid electrolyte consists of a solid ionically conductive powder, particularly inorganic powders such as glass and ceramics, contained within an ionically conductive polymeric material. The polymeric material forms a matrix for housing the solid powder and provides added strength to the electrolyte material.

In accordance with one embodiment of the present invention the composite solid electrolyte comprises a mixture of an ionically conductive powder and an ionically conductive polymeric material, wherein the polymeric material forms a matrix for housing the conductive powder. The ionically conductive powder may be mixed with an ionically conductive polymerizable or crosslinkable material which is subsequently cured to form the matrix.

In accordance with the most typical embodiments of the invention, the ionically conductive materials which form the matrix are low molecular weight compounds having at least one heteroatom capable of forming donor acceptor bonds with alkali metal ions, earth alkali ions, silver ions, protons or proton-transporting ions. These materials may be polymeric in their natural form, or may be produced by curing a polymerizable or crosslinkable material which includes heteroatoms capable of forming donor acceptor bonds as described above. When the matrix forming material is produced by a curing procedure, the materials may be either radiation curable or thermally curable. When using a radiation curable ionically conductive material, exposure of the mixture produces an ionically conductive crosslinked or polymerized matrix which is interpenetrated by the solid ionically conductive powder. The support of the powder in the matrix provides an electrolyte material having improved mechanical strength and excellent ionic conductivity. For example, in comparison to systems using a nonconductive matrix material, the conductivity of the inventive electrolyte is improved by at least a factor of $10^3$.

Another embodiment of the present invention provides a method for producing the composite solid electrolyte. The method comprises the steps of forming a mixture of solid ionically conductive powder and a solid ionically conductive polymeric material; and forming a matrix of said ionically conductive polymeric material, wherein said solid ionically conductive powder interpenetrates said matrix.

The method of the present invention for producing a composite solid electrolyte is particularly advantageous because it can be used in the manufacture of the anode and cathode half elements as well as the manufacture of the electrochemical device produced from the anode and cathode half elements. Anode half elements can be prepared by coating the aforementioned mixture on a metal foil, for instance lithium metal on nickel or copper foil, and curing the coated foil, if necessary. The foil emerges with the composite solid electrolyte adhered to its surface. This not only provides intimate contact between the foil and the electrolyte but it also protects the underlying foil surface from damage during subsequent manufacturing operations in which it is assembled with the cathode element.

Similarly, the inventive electrolyte material may be coated onto a cathode material and cured, if necessary. Alternatively, the cathode half element may be prepared by modifying the mixture to include the cathode material (e.g., $V_6O_{13}$) and a conductor (e.g., carbon black), coating the mixture on a metal foil support for the cathode half element, and curing the mixture, if necessary.

In forming completed electrochemical cells, the manufacture of the anode and the cathode half elements is merged into a single operation wherein the coated anode and cathode foil members are assembled. In one embodiment, after assembly, the cathode and anode members are cured together to form a completed cell. Cured anode and cathode half elements prepared as above can also be assembled using heat and pressure for lamination. Various other formats are also possible.

Accordingly, it is an object of the present invention to provide a composite solid electrolyte having improved mechanical properties.

A further object of the present invention is to provide a process for producing a composite solid electrolyte having improved mechanical properties.

It is still a further object of the present invention to provide a method for forming an electrochemical cell containing a composite solid electrolyte having improved mechanical properties.

These, and other objects will be appreciated by one skilled in the art as reference is made to the detailed description of the preferred embodiments.

DEFINITION

The term "solid ionically conductive powder" defines an inorganic material which, in its solid form, is capable of ionically conducting alkali metal ions, earth alkali ions, silver ions, protons or proton-transporting ions. The powders of the present invention are specifically distinguished from so called solid electrolytes which are actually solid solutions of an ionizable alkali salt complexed with a polymer having at least one hetero atom in its monomer pattern (e.g. $LiClO_4$/polyethylene oxide complex).

DETAILED DESCRIPTION OF THE PREFERRED EMBODIMENTS

In describing the preferred embodiments, certain terminology will be utilized for the sake of clarity. It is intended that this terminology cover not only the recited embodiments, but all technical equivalents which operate in the same manner, for the same purpose, to achieve the same result.

The present invention resides in a composite solid electrolyte wherein a solid ionically conductive powder is maintained in an ionically conductive polymeric matrix. The containment of the solid ionically conductive powder in the polymeric matrix produces an electrolyte which has excellent ionic conductivity and superior strength properties.

The matrix which is interpenetrated by the solid ionically conducting powder in the present invention may be a polymeric material in its natural form or may take the form of a cured polymerizable or crosslinkable monomer.

General examples of useful polymers are described in U.S. Pat. No. 4,303,748 to Armand and European Application No. 0 145 498 to Cook. These polymers have repeating units containing at least one heteroatom such as an oxygen or nitrogen atom. They can be represented as polymers having the repeating unit

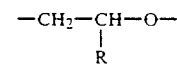

wherein R is hydrogen or a group Ra, -CH$_2$ORa, -CH$_2$OReRa, -CH$_2$N(CH$_3$)$_2$, in which Ra is an alkyl group containing 1 to 16 carbon atoms and preferably 1 to 4 carbon atoms or a cycloalkyl group containing 5 to 8 carbon atoms, and Re is an ether group of formula -CH$_2$-CH$_2$Op- wherein p is a number from 1 to 100, preferably 1 or 2:

or having the repeating unit

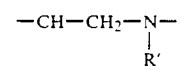

wherein R' is Ra, or ReRa, as defined above; or having the repeating unit

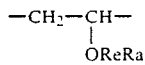

wherein Re and Ra are as defined above. Copolymers of the above polymers may also be useful.

Ionically conductive curable materials useful in the present invention are compounds having at least one and preferably a plurality of heteroatoms particularly oxygen and/or nitrogen atoms capable of forming donor acceptor bonds with alkali metal ions, earth alkali ions, silver ions, protons or proton-transporting ions, and which are terminated by radiation polymerizable moieties. For example, they may be low molecular weight oligomers of the formulae:

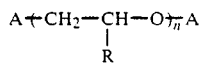

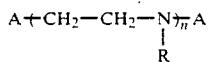

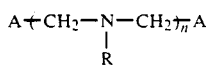

where n is about 3 to 50 and R is hydrogen or a C1-C3 alkyl group which are terminated by ethylenically unsaturated moieties or glycidyl moieties represented by A. A particularly useful group of compounds is obtained by reacting a polyethylene glycol with acrylic or methacrylic acid. Polyethylene glycol diacrylate is a particularly preferred polymer. To provide additional structural integrity, triacrylate prepolymers may be added.

Preferably, the ionically conductive polymeric materials have a molecular weight of about 200 to 800. Still more preferably they are liquids at temperatures less than 30° C.

It may be desirable to include a radiation curable comonomer in the composition to reduce the glass transition temperature and improve conductivity of the polymer. Monoacrylate materials are particularly suitable for this purpose.

Also useful as comonomers in the present invention are nonconductive radiation curable materials such as acrylated epoxies, e.g., Bisphenol A epoxy diacrylate, polyester acrylate, glycidyl ethers with acrylates, and a vinyl compound such as N-vinylpyrrolidone.

The solid ionically conductive powders which are maintained in the ionically conductive matrix are capable of ionically conducting alkali metal ions, earth alkali ions, protons or proton-transporting ions. These materials are inorganic in nature and often are glass or ceramic materials. Examples of solid ionically conductive powders which may be used in the present invention include $RbAg_4I_5$, $RbCu_{16}I_{17}Cl_{13}$, $Na\beta$-$Al_2O_3$, $Ag_6I_4WO_4$, polycrystalline LiI, $Na_3Zr_2Si_2PO_{12}$, $\beta$-$PbF_2$, $LiI(Al_2O_3)$, and $B_2S_3$-$Li_2S$-$LiI$. Other solid ionically conductive powders suitable for use in the present invention include those disclosed in U.S. Pat. Nos. 4,247,499; 4,388,385; 4,394,280; 4,414,607; 4,432,891; 4,539,276; and 4,557,985. The solid ionically conductive powders typically have an ionic conductivity ranging between about 0.1 ohm$^{-1}$cm$^{-1}$ and about $1.0 \times 10^5$ ohm$^{-1}$cm$^{-1}$.

The mixture of this invention contains about 50 to 99 weight percent solid ionically conductive powders and about 1 to about 50 weight percent ionically conductive polymeric material. The exact amount will vary with the nature of the polymeric material and the affinity of the polymeric material for the solid ionically conductive powders. As a general rule, at least 2 percent of the polymeric material must be added to demonstrate an appreciable improvement in mechanical properties.

To produce the inventive composite solid electrolyte, the solid ionically conductive powders and the ionically conductive polymeric material are mixed together. In the case where the polymeric material is a radiation cured polymerizable or crosslinkable material, the mixture is passed through a source of actinic radiation. Similarly, if the polymeric material is a thermally cured polymerizable or crosslinkable material, the mixture is heated to initiate polymerization. No materials other than the solid ionically conductive powders and the ionically conductive polymeric material need be present to form the composite solid electrolyte. However, as will be recognized by those skilled in the art, additives such as surfactants may be added to the mixture in minimal amounts.

The mixture may also include additional materials to provide additional improvements in properties such as ionic conductivity, mechanical strength, flexibility, and the like. An example of an additive material which is radiation curable is polyethylene oxide. To produce a composite electrolyte containing the additive polymer, the additive polymer is mixed into the mixture, the resultant material is extrusion coated onto a substrate, and the extruded material is passed through a source of actinic radiation to cure the mixture.

The term "actinic radiation" as used herein includes the entire electromagnetic spectrum and electron beam and gamma radiation. It is anticipated, however, based on availability of radiation sources and simplicity of equipment that electron beam and ultraviolet radiation will be used most often. Electron beam and gamma radiation are advantageous because they do not require the presence of a photoinitiator. When a photoinitiator is required, for example when using ultraviolet radiation, any conventional initiator may be used. When using electron beam, the beam potential must be sufficiently high to penetrate the electrode layer, the anode or cathode half element, or the cell itself depending upon which manufacturing technique is adopted. Voltages of 175 to 300 KV are generally useful. The beam dosage and the speed with which the element traverses the beam are adjusted to control the degree of crosslinking in an otherwise known manner.

The method of the present invention can be used to produce free standing solid thin electrolyte films or electrode half elements. To produce a free standing film, the mixture is poured into a mold or coated onto a surface having a release characteristic such as polytetrafluoroethylene. If the polymeric material is radiation curable, the mixture is cured by exposure to actinic radiation. The radiation curable mixture may also be coated on a metal foil such as aluminum foil, or can be cast in a container prior to curing. The film thickness can vary but films about 25 microns thick are useful in many applications. The obtained film can be assembled between cathode and anode half elements prepared by the processes disclosed herein or other processes and laminated under heat and pressure. A conductive adhesive may be used if necessary, although not required.

The composite solid thin film electrolyte produced has significantly improved mechanical properties when compared to solid electrolytes which are not maintained in a matrix of polymeric material. A problem with pressed or formed solid ionically conductive powders (without polymeric materials) is their brittle nature which render them susceptible to cracks and fractures as a result of applied stress forces. By comparison, the inventive composite solid electrolytes are much stronger than the prior electrolytes and are much more flexible than the prior electrolytes. As a result, the inventive electrolytes are much more capable of withstanding stress forces without risking fracture. Further, by using an ionically conductive polymeric matrix, the ionic conductivity of the electrolyte is far superior to electrolytes comprising ionically conductive powder maintained in a non-conductive polymeric matrix. Increases in ionic conductivity by a factor of at least 1000 could be achieved in accordance with the present invention as compared to electrolytes having ionically conductive powder maintained within a non-conductive matrix.

To manufacture an electrochemical cell, the electrolyte is placed between an anode material and a cathode material, and the materials are laminated together, typically under heat and pressure. The cell may optionally contain a current collector attached to the face of the cathode not contacting the electrolyte. If the polymeric material used to form the ionically conductive matrix is radiation curable, the electrochemical device can be assembled and then cured in situ. For example, in accordance with the present invention, a lithium coated foil member can be coated with the inventive radiation polymerizable electrolyte composition and over coated with the cathode coating composition described previously; or nickel foil can be coated with the cathode coating composition described previously and overcoated with the inventive radiation polymerizable electrolyte composition. This structure can be cured by exposure to electron beam or another source of actinic radiation and the remaining electrically conductive foil member can be assembled with it. In another embodiment the latter foil member may be assembled with the structure prior to curing.

Anode half elements are obtained by coating a foil of the anode metal with the composite electrolyte. If the polymeric material is radiation curable, the coated foil is exposed to radiation. A typical foil is lithium foil or lithium coated foil such as nickel or copper foil having a layer of lithium deposited on its surface. Lithium is preferred because it is extremely electropositive and light in weight. The radiation curable composition may be coated onto the foil in any manner. The prepolymer selected which cures upon exposure to actinic radiation is extremely stable and does not chemically react with the lithium. Suitable techniques include rod coating, roll coating, blade coating, etc.

In a preferred embodiment the cathode coating composition contains the same polymer phase as binder as the polymeric material of the inventive composite electrolyte. There is no phase separation between the cathode and the electrolyte and as a result, the interfacial resistance between these components of an electrochemical cell is significantly reduced.

Coating compositions for cathode half elements include particles of an insertion compound and an electrically conductive material along with the electrolyte composition used in the present invention, which functions as a dispersing medium for the cathode materials. A typical coating formulation for a cathode half element may contain about 50 to 80 parts of insertion compound, about 2 to 15 parts of an electrically conductive particle such as carbon black and about 15 to 50 parts of the ionically conductive electrolyte composition described above. The cathode half element is obtained by coating a foil member such as nickel foil in a thickness of about 10 to 100 microns with the aforesaid composition. If necessary, the cathode half element may be radiation or thermally cured. Alternatively, a polymer phase different than the electrolyte phase may function to bind the insertion compound and electrically conductive material to a substrate.

Insertion compounds and conductive particles useful in the present invention are well known in the art. Representative examples of insertion compounds are $V_6O_{13}$, $MoO_2$, $MnO_2$ and $TiS_2$. Other examples can be found in the aforementioned references. A conductive particle is carbon black.

In accordance with a further embodiment of the invention, the composite cathodic particles described in U.S. Pat. No. 4,576,883 to Hope can be dispersed in the inventive electrolyte and coated on a metal foil member as described above.

In preparing the coating compositions for the cathode half element, a small amount of a volatile solvent and a dispersing agent can be added to disperse the cathodic materials in the composition and produce a composition having good coating characteristics.

It is particularly envisioned that the inventive electrolyte be used in an electrochemical cell. However, as will be appreciated in the art, the inventive electrolyte may be used in other electrical components, such as capacitors.

Having described the invention in detail and by reference to preferred embodiments thereof, it will be apparent that modifications and variations are possible without departing from the scope of the appended claims.

What is claimed is:

1. A composite solid electrolyte comprising a mixture of a solid ionically conductive powder and an ionically conductive polymeric material wherein said polymeric material provides a matrix for containing said solid ionically conductive powder.

2. The electrolyte of claim 1 wherein said polymeric material contains a repeating unit selected from the group consisting of:

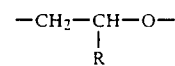

wherein R is hydrogen or a group Ra, -CH$_2$ORa, -CH$_2$OReRa, -CH$_2$N(CH$_3$)$_2$, in which Ra is an alkyl group containing 1 to 16 carbon atoms and preferably 1 to 4 carbon atoms or a cycloalkyl group containing 5 to 8 carbon atoms, and Re is an ether group of formula -CH$_2$-CH$_2$Op- wherein p is a number from 1 to 100, preferably 1 or 2;

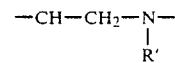

wherein R' is Ra, or ReRa, as defined above; and

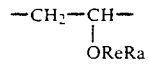

wherein Re and Ra are as defined above.

3. The electrolyte of claim 1 wherein said polymeric material comprises a cured polymerizable or crosslinkable material.

4. The electrolyte of claim 3 wherein said polymeric material is thermally or radiation cured.

5. The electrolyte of claim 4 wherein said polymeric material is radiation cured and includes a repeating unit of any of the following formulae:

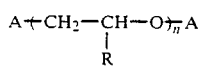

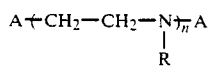

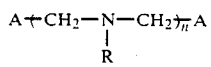

where R is hydrogen or an alkyl group containing between 1 and 3 carbon atoms and n is an integer ranging between about 3 and about 50.

6. The electrolyte of claim 5 wherein said polymeric material is ethylenically unsaturated.

7. The electrolyte of claim 1 wherein said ionically conductive powder comprises an inorganic powder, a glass powder or a ceramic powder.

8. The electrolyte of claim 7 wherein said solid ionically conductive powder is selected from the group consisting of $RbAg_4I_5$, $RbCu_{16}I_7Cl_{13}$, $Na\beta$-alumina, $Ag_6I_4\cdot WO_4$, polycrystalline LiI, $Na_3Zr_2Si_2PO_{12}$, $\beta$-$PbF_2$, $LiI(Al_2O_3)$ and $B_2S_3$-$Li_2S$-LiI.

9. The electrolyte of claim 1 wherein said electrolyte further comprises an additional curable polymerizable or crosslinkable material.

10. The electrolyte of claim 9 wherein said curable material comprises a nonconductive material.

11. An electrode half element comprising a metal foil having coated thereon the electrolyte of claim 1.

12. The element of claim 11 wherein said electrode is a cathode and said cathode additionally includes an insertion compound and electrically conductive particles.

13. The element of claim 11 wherein said electrode is an anode.

14. The element of claim 13 wherein said metal foil is a lithium foil or a lithium coated foil.

15. A method for forming a composite solid electrolyte comprising the steps of:
forming a mixture of solid ionically conductive powder and a solid ionically conductive polymerizable or crosslinkable material; and
forming a matrix of an ionically conductive polymeric material from said mixture; wherein said solid ionically conductive powder interpenetrates said matrix.

16. The method according to claim 15 wherein said polymeric material contains a repeating unit selected from the group consisting of:

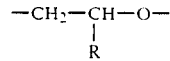

wherein R is hydrogen or a group Ra, -CH2ORa, -CH2OReRa, -CH2N(CH3)2, in which Ra is an alkyl group containing 1 to 16 carbon atoms and preferably 1 to 4 carbon atoms or a cycloalkyl group containing 5 to 8 carbon atoms, and Re is an ether group of formula -CH2-CH2Op- wherein p is a number from 1 to 100, preferably 1 or 2;

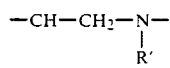

wherein R' is Ra, or ReRa, as defined above; and

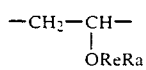

wherein Re and Ra are as defined above.

17. The method according to claim 15 wherein said polymeric material comprises a cured polymerizable or crosslinkable material.

18. The method of claim 17 wherein said polymerizable material includes a repeating unit of any of the following formulae:

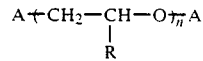

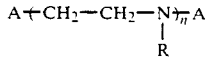

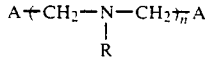

where R is hydrogen or an alkyl group containing between 1 and 3 carbon atoms and n is an integer ranging between about 3 and about 50.

19. The method of claim 18 wherein said polymerizable material is ethylenically unsaturated.

20. The method of claim 15 wherein said solid ionically conductive powder comprises an inorganic powder, a glass powder or a ceramic powder.

21. The method of claim 20 wherein said solid ionically conductive powder is selected from the group consisting of $RbAg_4I_5$, $RbCu_{16}I_7Cl_{13}$, $Na\beta$-alumina, $Ag_6I_4\cdot WO_4$, polycrystalline LiI, $Na_3Zr_2Si_2PO_{12}$, $\beta$-$PbF_2$, $LiI(Al_2O_3)$ and $B_2S_3$-$Li_2S$-LiI.

22. A solid state electrochemical cell including a composite solid electrolyte formed by the method of claim 15.

23. A method for forming an electrochemical cell which comprises assembling an anode half element and a cathode half element with a solid composite electrolyte therebetween, said solid composite electrolyte comprising a mixture of a solid ionically conductive powder and an ionically conductive polymeric material.

* * * * *